United States Patent
Mo

(10) Patent No.: US 12,502,561 B2
(45) Date of Patent: Dec. 23, 2025

(54) 4TH GENERATION LINEAR-FOCUSED-TYPE HIGH-INTENSITY FOCUSED ULTRASOUND SYSTEM

(71) Applicant: WEVER INSTRUMENTS CO., LTD, Uijeongbu-si (KR)

(72) Inventor: Seong Hui Mo, Seoul (KR)

(73) Assignee: WEVER INSTRUMENTS CO., LTD, Uijeongbu-si (KR)

( * ) Notice: Subject to any disclaimer, the term of this patent is extended or adjusted under 35 U.S.C. 154(b) by 0 days.

(21) Appl. No.: 18/882,647

(22) Filed: Sep. 11, 2024

(65) Prior Publication Data

US 2025/0050138 A1    Feb. 13, 2025

Related U.S. Application Data

(63) Continuation of application No. PCT/KR2024/010731, filed on Jul. 24, 2024.

(30) Foreign Application Priority Data

Aug. 9, 2023    (KR) .................. 10-2023-0104018

(51) Int. Cl.
*A61N 7/02*    (2006.01)
*A61N 7/00*    (2006.01)
*B06B 1/06*    (2006.01)

(52) U.S. Cl.
CPC .............. *A61N 7/02* (2013.01); *B06B 1/0622* (2013.01); *A61N 2007/0034* (2013.01); *A61N 2007/0065* (2013.01); *B06B 2201/76* (2013.01)

(58) Field of Classification Search
CPC .............. A61N 7/02; A61N 2007/0034; A61N 2007/0065; B06B 1/0622; B06B 2201/76
See application file for complete search history.

(56) References Cited

U.S. PATENT DOCUMENTS

| | | | |
|---|---|---|---|
| 2011/0077557 A1* | 3/2011 | Wing ............... | A61B 8/546 601/2 |
| 2012/0116379 A1* | 5/2012 | Yates ............... | A61B 34/25 606/33 |
| 2012/0265196 A1* | 10/2012 | Turner ............. | H01H 1/00 606/34 |
| 2013/0110103 A1* | 5/2013 | Assmus ............ | A61B 18/12 606/37 |
| 2023/0329559 A1* | 10/2023 | Xu ................... | A61B 90/37 |

* cited by examiner

*Primary Examiner* — Hien N Nguyen
(74) *Attorney, Agent, or Firm* — CANTOR COLBURN LLP

(57) ABSTRACT

Provided is a 4th generation linear-focused-type high-intensity focused ultrasound system using 4th generation linear-focused-type high-intensity focused ultrasound (HIFU) in which an element array plate is formed in two stages and may be selectively used depending on a specific part of the human body. When the system is used for a deep area or a thin area depending on a specific part of the human body, a first stage and a second stage are selectively used, or the first stage and the second stage are used at the same time for intensive irradiation.

3 Claims, 4 Drawing Sheets

4TH GENERATION LINEAR-FOCUSED-TYPE HIGH-INTENSITY FOCUSED ULTRASOUND SYSTEM

TECHNICAL FIELD

The present invention relates to a high-intensity focused ultrasound system, and more particularly, to a 4th generation linear-focused-type high-intensity focused ultrasound system using 4th generation linear-focused-type high-intensity focused ultrasound (hereinafter referred to as HIFU) in which an element array plate is formed in two stages and may be selectively used depending on a specific part of the human body.

BACKGROUND ART

With development of ultrasound therapy, tremendous progress has been made in checking and treating tumors by ultrasound therapy related to imaging devices, such as a B-mode ultrasound imaging device.

The B-mode ultrasound imaging device currently used in ultrasound therapy equipment is used to find out the position of a tumor and observe the tumor before ultrasound therapy. These devices perform MRI or CT checkouts for a certain period of time after treatment to determine whether a required therapeutic irradiation dose in a target area has been satisfied after treatment and whether coagulative necrosis of target tissues has occurred, and evaluate healing effects after the treatment.

In this method, there are many disadvantages because the healing effects are not observed at the right time and the irradiation dose for treatment is controlled only by experience.

If the irradiation dose is insufficient, diseased tissues are not effectively destroyed, and thus the healing effects may not be obtained. If the irradiation dose exceeds the required irradiation dose, normal tissues may be destroyed, and thus major safety problems may be caused.

However, the above conventional technology has problems, such as inability to be selectively used depending on a specific part of the human body, inability to provide intensive treatment to a specific part, and instability in case of system malfunction.

DISCLOSURE

Technical Problem

Therefore, the present invention has been made in view of the above problems, and it is an object of the present invention to provide a 4th generation linear-focused-type high-intensity focused ultrasound system using 4th generation linear-focused-type high-intensity focused ultrasound (HIFU) in which an element array plate is formed in two stages and may be selectively used depending on a specific part of the human body.

It is another object of the present invention to a 4th generation linear-focused-type high-intensity focused ultrasound system in which, when used for a deep area or a thin area depending on a specific part of the human body, a first stage and a second stage may be selectively used, or the first stage and the second stage may be used at the same time to enable intensive irradiation, and the system is operated when a detection sensor performs detection, to provide a sense of stability.

Objects to be solved by the present invention are not limited to the above-described objects, and other objects not mentioned will be clearly understood by those skilled in the art from the following description.

Technical Solution

In accordance with the present invention, the above and other objects can be accomplished by the provision of a 4th generation linear-focused-type high-intensity focused ultrasound system including a handpiece unit including a left handpiece and a right handpiece provided outside a main body, an element array plate configured such that a plurality of piezoelectric elements is arranged thereon and disposed in the right handpiece, and a controller, a first high-intensity focused ultrasound operator, a second high-intensity focused ultrasound operator, a power supply, a mounting unit, and a display unit provided in the main body, wherein the controller controls operation of a high voltage generator to generate high voltage to generate ultrasound when parameters are input by a user through a touch input unit, the high voltage is transmitted to the piezoelectric elements of the handpiece unit to generate the ultrasound, the power supply includes a noise filter and an SMPS, AC 200 V power is supplied and transmitted to the SMPS through the noise filter, the power supplied to the SMPS is converted to DC 24 V/12 V/5 V through an internal constant voltage circuit, and is output and supplied as driving powers of the controller, the display unit (LCD), and respective parts, some power is supplied to the high voltage generator of the mounting unit, the mounting unit includes the high voltage generator, a handpiece out, and a foot switch, and the handpiece unit is mounted outside the mounting unit so that the ultrasound generated by the main body is transmitted to a human body, and the display unit includes a display and the touch input unit on a front surface of the main body, and when the parameters are input by the user through the touch input unit, transmits the parameters to the controller, and displays data received from the controller on the display.

Other features and further details of the present invention are included in the detailed description and the drawings.

Advantageous Effects

A 4th generation linear-focused-type high-intensity focused ultrasound system according to the present invention using 4th generation linear-focused-type high-intensity focused ultrasound (HIFU) in which an element array plate is formed in two stages and may be selectively used depending on a specific part of the human body, provides various effects, such as pain relief and reduction of skin diseases, and particularly, has various effects, such as possibility of enabling irradiation in a wide area because the focus size of the HIFU is large, shortening of an irradiation time, excellent durability, and possibility of a customized mode for patients.

In addition, when used for a deep area or a thin area depending on a specific part of the human body, the system selectively uses a first stage and a second stage, or uses the first stage and the second stage at the same time to enable intensive irradiation, and the system is operated when a detection sensor performs detection, to provide a sense of stability.

The effects of the present invention are not limited to the above-mentioned effects, and other effects not mentioned will be clearly understood by those skilled in the art from the description below.

MODE FOR INVENTION

Figure 1:
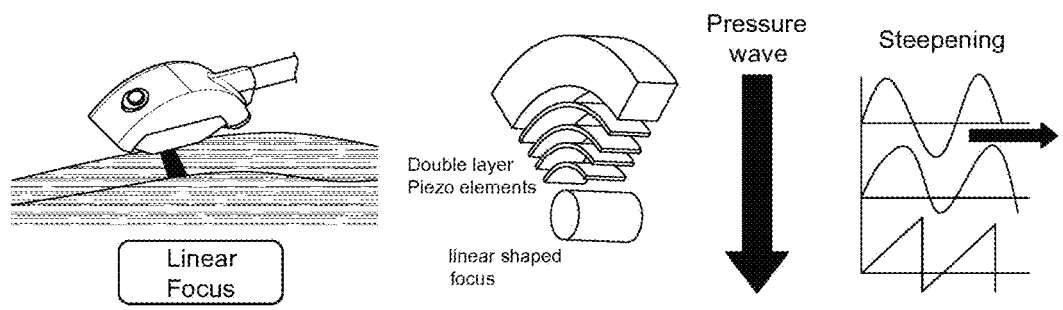
FIG. 1 is a state diagram showing the operating principle of focused ultrasound according to the present invention.

The present invention may be variously modified and have various embodiments, and specific embodiments are illustrated in the drawings and described in detail in the following description. However, this is not intended to limit the present invention to specific embodiments, but should be understood to include all modifications, equivalents, or substitutes included in the spirit and technical scope of the present invention. Similar reference numerals are used for similar components in describing each drawing.

The terms first, second, etc. may be used herein to describe various elements, but these elements should not be limited by these terms. These terms may be only used to distinguish one element from another element. For example, without departing from the scope of the present invention, a first element discussed below may be termed a second element, and similarly, a second element may also be termed a first element. As used herein, the term "and/or" includes a combination or any one of a plurality of associated listed items.

When an element or layer is referred to as being "connected to" or "coupled to" another element or layer, it should be understood that it may be directly connected or coupled to the other element or layer, or intervening elements or layers may be present. In contrast, when an element or layer is referred to as being "directly connected to" or "directly coupled to" another element or layer, it should be understood that there may be no intervening elements or layers present.

The terminology used herein is for the purpose of describing particular example embodiments only and is not intended to be limiting. Further, as used herein, singular expressions may be intended to include plural expressions as well, unless the context clearly indicates otherwise. In the following description of the embodiments, terms, such as "comprising", "having", etc., are inclusive and therefore specify the presence of stated features, numbers, steps, operations, elements, and/or combinations thereof, but do not preclude the presence or addition of one or more other features, numbers, steps, operations, elements, components, and/or combinations thereof.

The principle of 4th generation linear-focused-type high-intensity focused ultrasound (HIFU) of the present invention is the latest technology that utilizes heat generated when high-intensity ultrasound is focused on a point in the body. This is similar to the principle of kindling a fire by focusing warm sunlight with a magnifying glass, and the focused ultrasound may easily pass through body tissues. The field of pain relief that focuses high-intensity focused ultrasound (HIFU) energy on a point to break up calcification and regenerate damaged tissues is also being widely used in regenerative therapy of damaged skin layer tissues. In Korea, it is widely used in orthopedics, neurosurgery, rehabilitation medicine, pain medicine, surgery, dermatology, etc., but expensive important products from overseas are mostly used.

An exemplary embodiment of the present invention will be described in detail with reference to the accompanying drawings.

Figure 2:
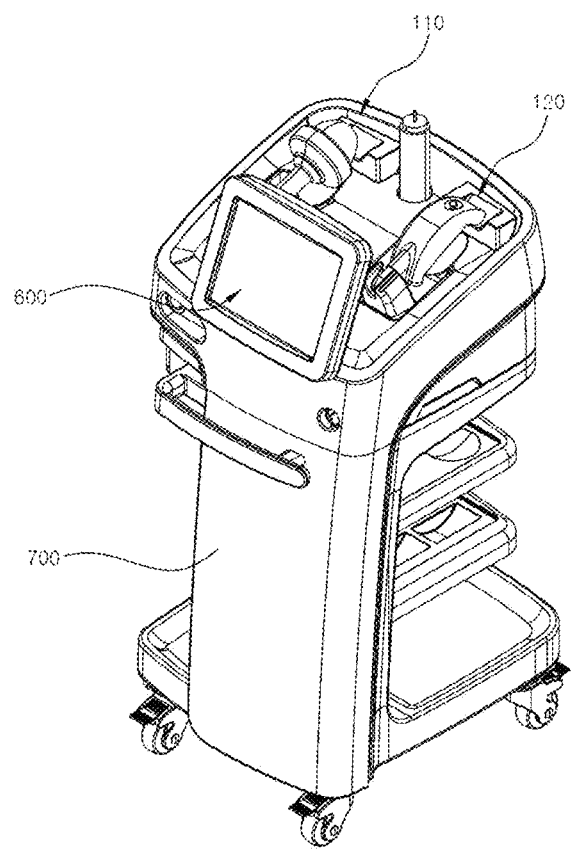
FIG. 2 is a perspective view showing the appearance of a 4th generation linear-focused-type high-intensity focused ultrasound system according to the present invention.
Figure 3:
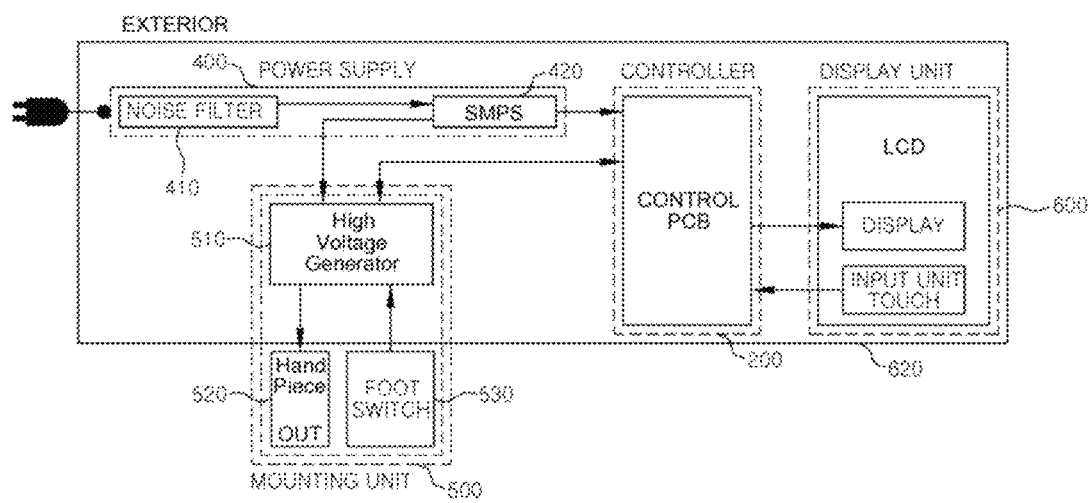
FIG. 3 is a block diagram showing the configuration of a power supply and control display in a main body shown in FIG. 2.
Figure 4:
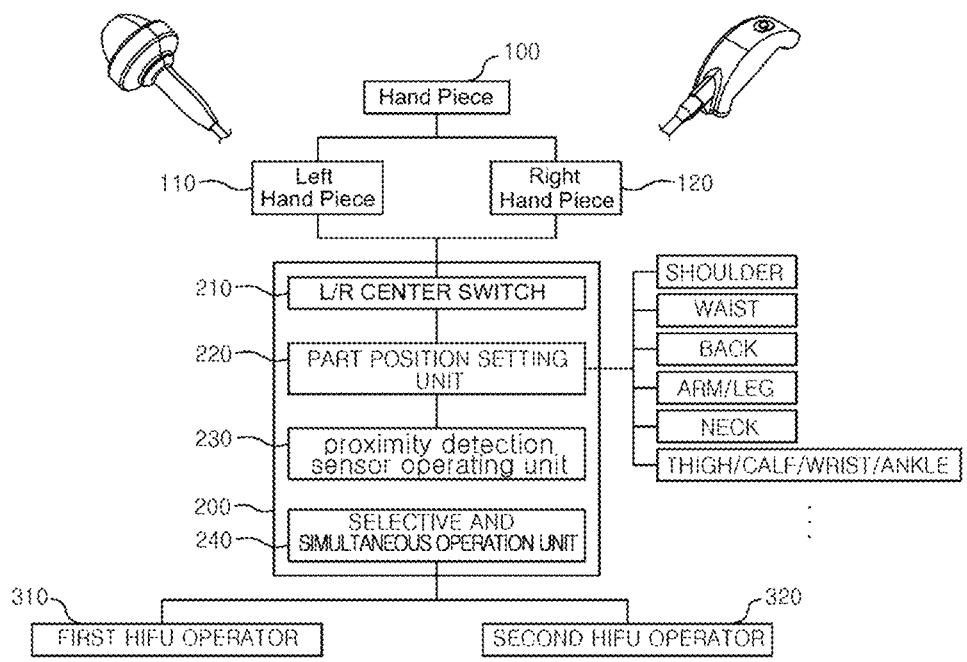
FIG. 4 is a control block diagram showing the operating state of the 4th generation linear-focused-type high-intensity focused ultrasound system according to the present invention.
Figure 5:
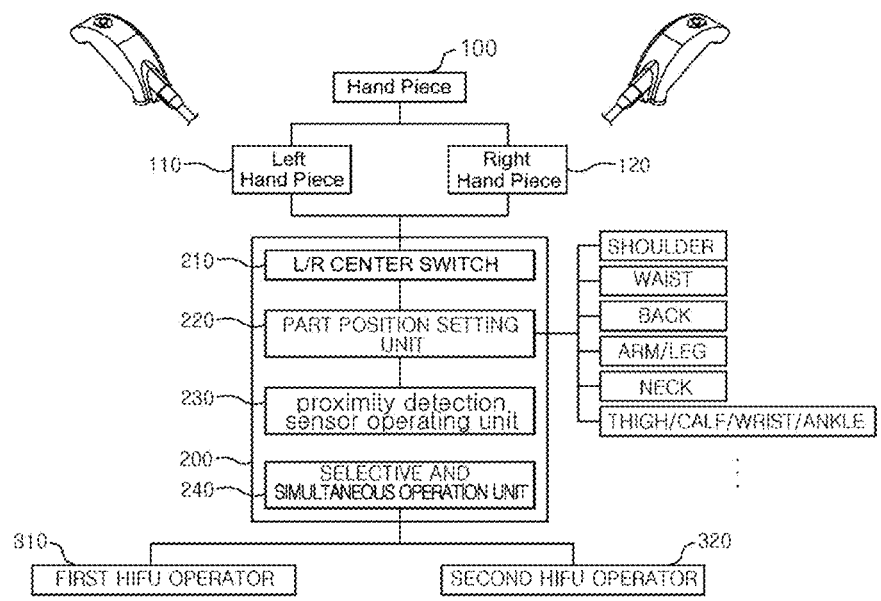
FIG. 5 is a control block diagram showing handpieces having a linear structure provided at both sides according to another embodiment of the present invention.
Figure 6:
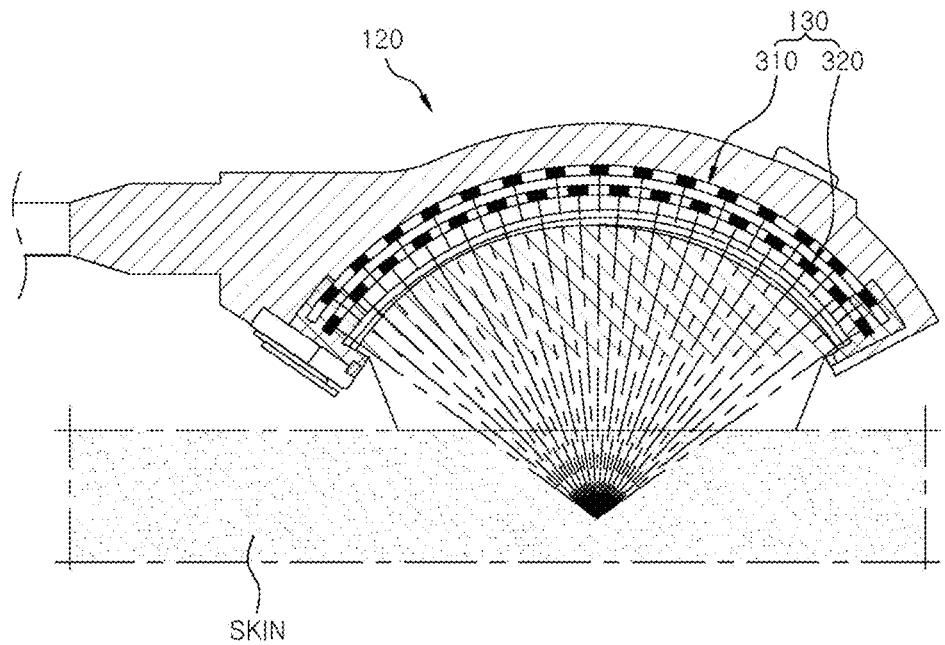
FIG. 6 is a cross-sectional view of a handpiece generating high-intensity focused ultrasound.
Figure 7:
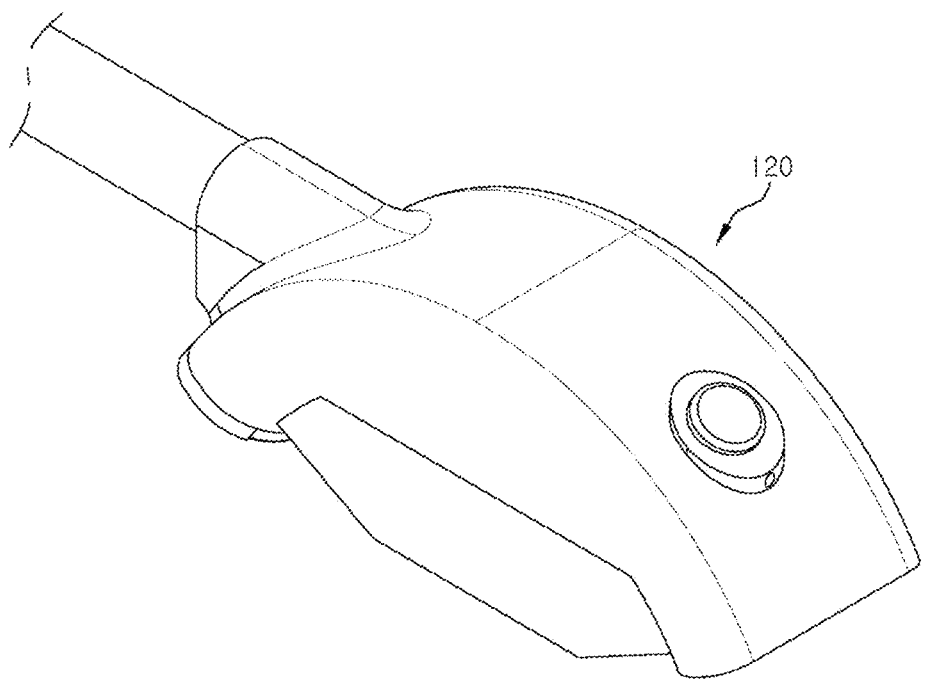
FIG. 7 is a perspective view showing the appearance of the handpiece shown in FIG. 6.

FIG. 1 is a state diagram showing the operating principle of focused ultrasound according to the present invention, FIG. 2 is a perspective view showing the appearance of a 4th generation linear-focused-type high-intensity focused ultrasound system according to the present invention, FIG. 3 is a block diagram showing the configuration of a power supply and control display in a main body shown in FIG. 2, FIG. 4 is a control block diagram showing the operating state of the 4th generation linear-focused-type high-intensity focused ultrasound system according to the present invention, and FIG. 5 is a control block diagram showing handpieces having a linear structure provided at both sides according to another embodiment of the present invention. In addition, FIG. 6 is a cross-sectional view of a handpiece generating high-intensity focused ultrasound, and FIG. 7 is a perspective view showing the appearance of the handpiece shown in FIG. 6.

As shown in FIG. 1, the principle is the latest technology that utilizes heat generated when high-intensity ultrasound is focused on a point in the body. This is similar to the principle of kindling a fire by focusing warm sunlight with a magnifying glass, and the focused ultrasound is characterized in that it may easily pass through body tissues.

As shown in the drawings, the 4th generation linear-focused-type high-intensity focused ultrasound system according to the present invention includes a handpiece unit 100 including a left handpiece 110 and a right handpiece 120 provided outside a main body 700, and an element array plate 130 disposed in the right handpiece 120 and including a plurality of piezoelectric elements arranged thereon.

The handpiece unit 100 is designed compactly to have a U-shaped concave inner surface to increase output performance, and approximately 350 piezoelectric elements are arranged in a two-layer structure with two rows in front and rear areas on the inner surface.

Experiment for various properties of piezoelectric elements and voltage application thereto was conducted by executing the performance test of the piezoelectric elements. Since the functions and properties of piezoelectric elements play an important role in durability because high-voltage pulses are used, the functions and properties of various domestic and foreign piezoelectric element products were tested and confirmed, and were utilized in the 4th generation linear-focused-type high-intensity focused ultrasound (HIFU) system according to the present invention.

The piezoelectric element discharge principle of the present invention is that the piezoelectric elements are arranged in a long mosaic shape in a container, and are simultaneously activated by a pulse generator, and the shape and pressure of focused ultrasound waves or pressure waves are determined depending on the shape of the container.

The piezoelectric elements may be simultaneously stimulated by short high-voltage (5 kV-6 kV) pulses, may be designed compactly without an additional reflector due to "direct focus" technology, and may provide a precise and refined focus area. Since the piezoelectric elements cause almost no pain and noise, it is possible to control energy and a penetration depth to increase patient satisfaction.

Focused ultrasound U-shaped technology should be designed with a 1~2 layer structure, and an external structure therefor should be precisely machined from stainless steel (SUS 304).

SUS 304 has excellent chemical resistance and heat resistance, and thus, there is almost no deformation of the appearance or color of the external structure. (SUS 304 includes 8~11% of Ni and 18~20% of Cr)

The piezoelectric elements are designed to form a focus at a maximum of 60 mm from the surface of focused ultrasound oscillated from a U-shaped structure of 65~70 R, if high voltage (5 kV-6 kV) pulses are applied to the piezoelectric elements for a short time (0.7~2 μs). The piezoelectric elements are precisely arranged so that each focused ultrasound pulse generated by the piezoelectric elements may be linearly focused on a specific point, and through the precise focus of the pulses, focused ultrasound is generated at this focal point.

The handpiece unit 100 according to the present invention is advantageous in that a focus area is wide and long, it is possible to control pulses depending on a specific part of the human body to enable time and period reduction, and the output is high. Further, extracorporeal shock wave therapy (ESWT) is limited to the field of pain, while high-intensity focused ultrasound may be utilized in various fields, such as wound relief and Buerger's disease.

A controller 200, a first high-intensity focused ultrasound operator 310, a second high-intensity focused ultrasound operator 320, a power supply 400, a mounting unit 500, and a display unit 600 are provided in the main body 700.

The controller 200 generates high voltage by controlling operation of a high voltage generator 510 to generate ultrasound when parameters are input by a user through a touch input unit 620, and the high voltage is transmitted to the piezoelectric elements of the handpiece unit 100 to generate the ultrasound.

Particularly, in order to effectively generate the 4th generation linear-focused-type high-intensity focused ultrasound (HIFU), the controller 200 controls high voltage (6~7 kV) pulses to be applied to the piezoelectric elements for a short time (0.7~2 μs) so that the ultrasound rapidly increases and then exponentially decreases and then negative pressure occurs for a short time.

Such technology requires high control and design technical skills of the high voltage generator 510.

The controller 200 selectively combines and controls the first high-intensity focused ultrasound operator 310 and the second high-intensity focused ultrasound operator 320 to generate the high-intensity focused ultrasound. Particularly, the controller 200 preferably controls the output so that a maximum pressure is 10 MPa, an energy density is 0160 mJ/mm$^2$, a maximum central penetration depth is 20 mm, and a focus size is 46×185×4 mm.

For this purpose, the controller 200 includes an L/R center switch unit 210, a part position setting unit 220, a proximity detection sensor operating unit 230, and a selective and simultaneous operation unit 240.

The L/R center switch unit 210 selects any one of the left and right handpieces 110 and 120, and the part position setting unit 220 sets the position of a body part including the shoulder, waist, back, arm, leg, neck, thigh, calf, wrist, or ankle.

The proximity detection sensor operating unit 230 selects a deep area or a thin area depending on a specific part of the human body through proximity detection.

The selective and simultaneous operation unit 240 selectively operates the first high-intensity focused ultrasound operator 310 and the second high-intensity focused ultrasound operator 320 depending proximity detection by the proximity detection sensor operating unit 230 to select an output from one of a first stage and a second stage, or to intensively irradiate the ultrasound simultaneously from the first stage and the second stage.

Particularly, it is characterized in that it is operated when a detection sensor of the proximity detection sensor operating unit 230 performs detection, to provide a sense of stability.

The power supply 400 includes a noise filter 410 and a switch-mode power supply (SMPS) 420, and AC 200 V power is supplied and transmitted to the SMPS 420 through the noise filter 410.

The power supplied to the SMPS 420 is converted to DC 24 V/12 V/5 V through an internal constant voltage circuit, and is output and supplied as driving powers of the controller 200, the display unit (LCD) 600, and the respective parts. Also, some power is supplied to the high voltage generator 510 of the mounting unit 500.

The mounting unit 500 includes the high voltage generator 510, a handpiece out 520, and a foot switch 530, and the handpiece unit 100 is mounted outside the mounting unit 500.

The handpiece unit 100 transmits the ultrasound generated by the main body equipped with the left handpiece 110 and the right handpiece 120 to the human body.

The display unit 600 includes a display 610 and a touch input unit 620 on the front surface of the main body 700.

When the parameters are input by the user through the touch input unit 620, the parameters are transmitted to the controller 200, and data received from the controller 200 is displayed on the display 610.

The embodiments of the present invention described herein and the configurations illustrated in the drawings are related to the preferred embodiments of the present invention, and may not encompass all the technical idea of the invention, and therefore, it should be understood that there may be various equivalents and modifications that may replace them at the time of application. Therefore, the present invention is not limited to the above-described embodiments, and those skilled in the art will appreciate that various modifications, additions and substitutions are possible, without departing from the scope and spirit of the invention as disclosed in the accompanying claims.

The invention claimed is:

1. A 4th generation linear-focused-type high-intensity focused ultrasound system comprising:
   a handpiece unit (100) comprising a left handpiece (110) and a right handpiece (120) provided outside a main body (700), and an element array plate (130) configured such that a plurality of piezoelectric elements is arranged thereon and disposed in the right handpiece; and
   a controller (200), a first high-intensity focused ultrasound operator (310), a second high-intensity focused ultrasound operator (320), a power supply (400), a mounting unit (500), and a display unit (600) provided in the main body (700), wherein:
   the controller (200) controls operation of a high voltage generator (510) to generate high voltage to generate ultrasound when parameters are input by a user through a touch input unit (620), and the high voltage is transmitted to the piezoelectric elements of the handpiece unit (100) to generate the ultrasound;

the power supply (400) comprises a noise filter (410) and a SMPS (420), AC 200 V power is supplied and transmitted to the SMPS (420) through the noise filter (410), the power supplied to the SMPS (420) is converted to DC 24 V/12 V/5 V through an internal constant voltage circuit, and is output and supplied as driving powers of the controller (200), and the display unit (LCD) (600), and some power is supplied to the high voltage generator (510) of the mounting unit (500);

the mounting unit (500) comprises the high voltage generator (510), a handpiece out (520), and a foot switch (530), and the handpiece unit (100) is mounted outside the mounting unit (500) so that the ultrasound generated by the main body is transmitted to a human body;

the display unit (600) comprises a display (610) and the touch input unit (620) on a front surface of the main body (700), and when the parameters are input by the user through the touch input unit (620), transmits the parameters to the controller (200), and displays data received from the controller (200) on the display (610);

the handpiece unit (100) is designed compactly to have a U-shaped concave inner surface to increase output performance, 350 piezoelectric elements are arranged in a two-layer structure with two rows in front and rear areas on the inner surface, and the piezoelectric elements are designed to form a focus at a maximum of 60 mm from a surface of focused ultrasound oscillated from a U-shaped structure of the inner surface, if high voltage (5 kV-6 kV) pulses are applied to the piezoelectric elements for a short time (0.7-2 μs); and the controller (200) controls high voltage (6~7 kV) pulses to be applied to the piezoelectric elements for a short time (0.7~2 μs) so that the ultrasound rapidly increases and then exponentially decreases and then negative pressure occurs for a short time so as to generate high-intensity focused ultrasound (HIFU).

2. The 4th generation linear-focused-type high-intensity focused ultrasound system according to claim 1, wherein the controller (200) selectively combines and controls the first high-intensity focused ultrasound operator (310) and the second high-intensity focused ultrasound operator (320) to generate the high-intensity focused ultrasound, and the controller (200) controls an output so that a maximum pressure is 10 MPa, an energy density is 0160 mJ/mm$^2$, a maximum central penetration depth is 20 mm, and a focus size is 46×185×4 mm.

3. The 4th generation linear-focused-type high-intensity focused ultrasound system according to claim 1, wherein the controller comprises:

an L/R center switch unit (210) configured to select any one of the left and right handpieces (110, 120), and a part position setting unit (220) configured to set a position of a body part comprising a shoulder, waist, back, arm, leg, neck, thigh, calf, wrist, or ankle; and a proximity detection sensor operating unit (230) configured to select a deep area or a thin area depending on a specific part of the human body through proximity detection, and a selective and simultaneous operation unit (240) configured to selectively operate the first high-intensity focused ultrasound operator (310) and the second high-intensity focused ultrasound operator (320) depending proximity detection by the proximity detection sensor operating unit (230) to select an output from one of a first stage and a second stage, or to intensively irradiate the ultrasound simultaneously from the first stage and the second stage.

* * * * *